US012470481B2

(12) United States Patent
Sullivan

(10) Patent No.: US 12,470,481 B2
(45) Date of Patent: Nov. 11, 2025

(54) CONTEXT-AWARE NETWORK STORAGE

(71) Applicant: The Boeing Company, Chicago, IL (US)

(72) Inventor: Scott Charles Sullivan, South Pasadena, CA (US)

(73) Assignee: THE BOEING COMPANY, Arlington, VA (US)

(*) Notice: Subject to any disclaimer, the term of this patent is extended or adjusted under 35 U.S.C. 154(b) by 309 days.

(21) Appl. No.: 18/064,799

(22) Filed: Dec. 12, 2022

(65) Prior Publication Data

US 2024/0195737 A1    Jun. 13, 2024

(51) Int. Cl.
*H04L 45/00* (2022.01)
*H04L 47/17* (2022.01)

(52) U.S. Cl.
CPC .............. *H04L 45/70* (2013.01); *H04L 47/17* (2013.01)

(58) Field of Classification Search
None
See application file for complete search history.

(56) References Cited

U.S. PATENT DOCUMENTS

| 11,283,768 | B1* | 3/2022 | Li | H04L 63/0245 |
| 2010/0014528 | A1* | 1/2010 | Amir | H04L 45/125 |
| | | | | 370/400 |
| 2014/0032730 | A1* | 1/2014 | Fall | H04L 67/02 |
| | | | | 709/223 |
| 2016/0350530 | A1* | 12/2016 | Wang | G06F 21/78 |
| 2021/0336886 | A1* | 10/2021 | Vijayasankar | H04L 43/0882 |

OTHER PUBLICATIONS

Extended European Search Report issued Feb. 14, 2024 in corresponding EP Application No. 23212968.4, 11 pages.
Warthman, "Delay- and Disruption-Tolerant Networks (DTNs), a Tutorial (version 2)," based on technology developed by the Interplanetary Internet Special Interest Group (IPNSIG, http://www.ipnsig.com), Jul. 23, 2012, 35 pages.

* cited by examiner

*Primary Examiner* — Anh Ngoc M Nguyen
(74) *Attorney, Agent, or Firm* — MH2 Technology Law Group LLP

(57) ABSTRACT

Techniques for sending data over a computer network from an origination computer to a destination computer are presented. The techniques include: receiving a demand communication from the origination computer, where the demand communication specifies at least one network parameter; determining that a path through the network from the origination computer to the destination computer that complies with the at least one network parameter is not available; sending data from the origination computer to a node in the network over a path that complies with the at least one network parameter, where the node is not the destination computer; and storing the data at the node in persistent memory.

20 Claims, 7 Drawing Sheets

CONTEXT-AWARE NETWORK STORAGE

FIELD

This disclosure relates generally to computer network communication.

BACKGROUND

Modern computer networks generally operate using packet switched communications. According to packet switched communications, data are grouped together into protocol data units, such as packets, which are formatted to include a header and a data payload. Information in the header may be used to route the protocol data units, and the payload may include data of interest. Packet switched communications may utilize multiple stacked protocol layers, by way of non-limiting example, from highest to lowest: an application layer (e.g., the data to be sent), a transport layer (e.g., TCP segments), a network layer (e.g., IP datagrams), a link protocol layer (e.g., frames), and a physical layer (e.g., the binary data sent over the communication channel). In general, the payload of protocol data units for a given layer may include the header information of higher-layer protocol data units.

Data sent over a network may travel from an origin computer to a destination computer through one or more computer nodes in the network. In packet switched communications, the nodes temporarily pass the data through volatile memory, e.g., RAM, rather than storing the data in persistent memory, e.g., a hard drive, before sending the data to a next node or the destination computer. Accordingly, packet switched communications are generally very fast, e.g., essentially real time, with the data transitioning through a node in only a few milliseconds.

Some networks are subject to frequent and prolonged disruptions. Examples include terrestrial networks in undeveloped areas, mobile communications networks such as cellular telephone networks, and networks for communications involving endpoints in space, such as between the Earth and probes on or orbiting other planets in the solar system. Disruptions in these and other networks may occur due to a variety of causes, e.g., mobile telephones passing through areas with no service, or satellites passing behind a planet. Further, individual disruptions may persist over a relatively long period of time, ranging from minutes to hours to days.

Delay tolerant networking is a networking technique that uses store-and-forward messaging, whereby data sent from an origin computer to a destination computer is held in persistent memory, such as a hard drive, at each intermediate node. Examples of delay tolerant networking include ION and IBR. Although delay tolerant networking can overcome some challenges presented by networks that are subject to frequent and prolonged disruptions, it is slow to send data due to its requirement of storing data in persistent memory at each intermediate node. Each hop from the origin computer to one or more an intermediate nodes to the destination computer incurs a temporal penalty, that is, a delay, due to the need to store the data in persistent memory and then retrieve the data from persistent memory for sending, which may take a few seconds or more at each node. Accordingly, delay tolerant networking can be unacceptably slow, even during times when the network is completely functional and devoid of disconnections or other disruptions.

Another problem with delay tolerant networking has to do with encryption. Delay tolerant networking uses an additional protocol layer above any packet switching protocol layers that are already used in the network. Such an additional protocol layer, referred to as a "bundle protocol layer," uses additional respective protocol data unit headers and protocol data unit payloads, the latter of which include the headers from lower layer protocol data units. In general, a network user may wish to encrypt their data, including all protocol data unit payload data above a specified layer. (As used herein, the term "user" includes a computer, and may not involve a human; for example, a "user" may be an autonomous computer.) For example, a user may wish to encrypt bundle payload data and bundle headers, but leave lower layer headers, such as transport protocol (TCP) and network protocol (IP) layers unencrypted. However, some networks include security domains that do not permit decryption. Delay tolerant networking within a security domain that forbids decryption is not possible with encrypted bundle protocol headers, because the routing information within such encrypted bundle headers is inaccessible unless decrypted.

SUMMARY

According to various embodiments, a method of sending data over a computer network from an origination computer to a destination computer is presented. The method includes: receiving a demand communication from the origination computer, wherein the demand communication specifies at least one network parameter; determining that a path through the network from the origination computer to the destination computer that complies with the at least one network parameter is not available; sending data from the origination computer to a node in the network over a path that complies with the at least one network parameter, wherein the node is not the destination computer; and storing the data at the node in persistent memory.

Various optional features of the above embodiments include the following. The sending the data may include sending the data through at least one intermediate node using packet switching without storing the data in persistent memory at the intermediate node. The method may include, after the determining that a path through the network from the origination computer to the destination computer that complies with the at least one network parameter is not available: receiving a second demand communication from the node, wherein the second demand communication specifies the at least one network parameter; determining that a path from the node to the destination computer that complies with the at least one network parameter is available; and sending the data from the node to the destination computer using packet switching. The method may further include, after the determining that a path through the network from the origination computer to the destination computer that complies with the at least one network parameter is not available: receiving a second demand communication from the node, wherein the second demand communication specifies the at least one network parameter; determining that a path from the node to a next node that complies with the at least one network parameter is available; sending the data from the node to the next node using packet switching; and storing the data at the next node in persistent memory. The at least one network parameter may include at least one of: a specified bandwidth, a specified network loss, a specified delay, or a specified priority. The demand communication may specify a size of the data. The node may be space based. The sending the data may include sending a plurality of protocol data units, wherein each of the protocol data units comprises a header and an encrypted payload, and the storing may include storing the protocol data units in association with an order of arrival. The method may include sending the protocol data units from the node to one of a next node or the destination computer without requiring decryption of any encrypted payload. The storing may include storing in a black security domain, and each encrypted payload may be stored in encrypted format.

According to various embodiments, a system for sending data over a computer network from an origination computer to a destination computer is presented. The system includes: an origination computer disposed to send a demand communication to a traffic engineering manager, wherein the demand communication specifies at least one network parameter; a traffic engineering manager disposed to receive the demand communication from the origination computer and determine that a path through the network from the origination computer to the destination computer that complies with the at least one network parameter is not available; and a node in the network disposed to receive the data from the origination computer over a path that complies with the at least one network parameter and store the data at the node in persistent memory, wherein the node is not the destination computer.

Various optional features of the above embodiments include the following. The system may include an intermediate node, wherein the origination computer sends the data through the intermediate node to the node using packet switching without the data being stored in persistent memory at the intermediate node. The node may be disposed to send a second demand communication to a second traffic engineering manager, wherein the second demand communication specifies the at least one network parameter, and the system may further include: a second traffic engineering manager disposed to receive the second demand communication from the node and determine that a path from the node to the destination computer that complies with the at least one network parameter is available, wherein the node sends to data to the destination computer. The node may be disposed to send a second demand communication to a second traffic engineering manager, wherein the second demand communication specifies the at least one network parameter, and the system may include: a second traffic engineering manager disposed to receive the second demand communication from the node and determine that a path from the node to a next node that complies with the at least one network parameter is available; and a next node disposed to receive the data from the node and store the data in persistent memory. The at least one network parameter may include at least one of: a specified bandwidth, a specified network loss, a specified delay, or a specified priority. The demand communication may specify a size of the data. The node may be space based. The origination computer may send the data in a plurality of protocol data units, wherein each of the protocol data units comprises a header and an encrypted payload, and the node may store the protocol data units in association with an order of arrival. The node may be configured to send the protocol data units to one of a next node or to the destination computer without requiring decryption of any encrypted payload. The node may be configured to store the protocol data units in encrypted format in a black security domain.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DESCRIPTION OF THE EXAMPLES

Figure 1:
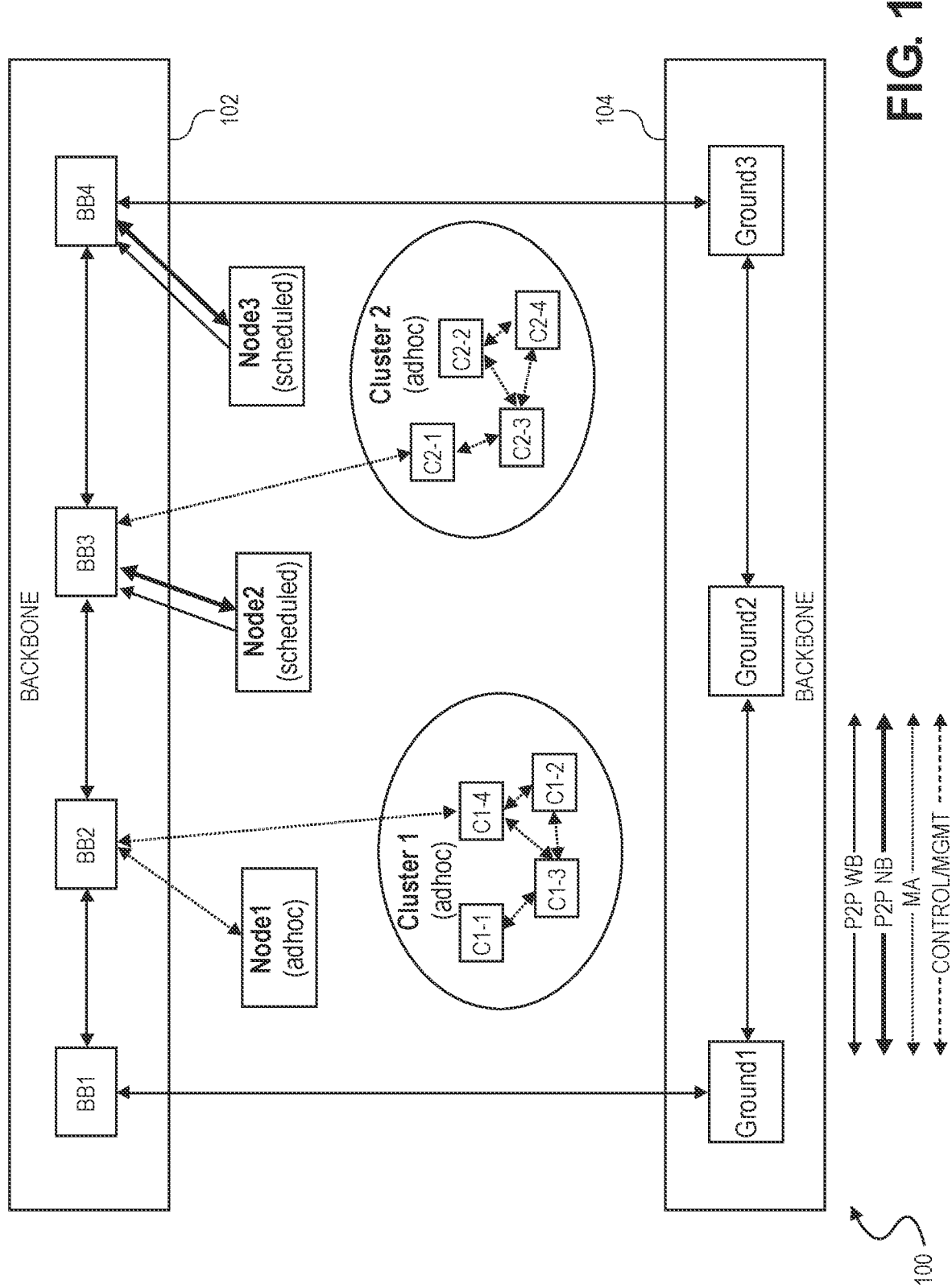
FIG. 1 is a schematic diagram of a ground and space based network system suitable for implementations according to various embodiments.

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

Some embodiments solve the problem of sending data from an origination computer to a destination computer over a network that is subject to frequent and prolonged disruptions without incurring mandatory per-hop penalties.

According to some embodiments, to send data from an origination computer to a destination computer, the origination computer sends a demand communication to a traffic engineering manager, specifying the transmission size and required network parameters, e.g., capacity (bandwidth) and quality of service (e.g., delay, loss, and/or jitter), for the transmission. A message priority and/or an expiration time may also optionally be specified. The traffic engineering manager determines whether an end-to-end path from the origination computer to the destination computer exists at the present time that complies with the network parameters. If not, the traffic engineering manager determines an intermediate storage node with sufficient storage capacity based on the demand communication, and provisions a path that complies with the specified network parameters to that node. All packets from the origination computer to the intermediate storage node are packet switched, as opposed to being completely stored in persistent memory and forwarded in intervening nodes as in delay tolerant networking systems. This frees up the origination computer's local storage to continue performing mission related activities, while the network continually attempts to move the stored data to the specified destination computer.

Some embodiments can operate in security domains that forbid decryption. For example, rather than imposing an additional top-layer protocol, such as delay tolerant networking's bundle protocol, some embodiments utilize existing protocol layers. Some embodiments permit encrypting data of any protocol layer that may otherwise be encrypted in the network. For example, some embodiments allow for encryption of any protocol layer that would otherwise be permitted in a security domain that forbids decryption. By way of non-limiting example, some embodiments permit encryption at and above the transport protocol layer.

Some embodiments take advantage of information regarding where storage is located in the network (i.e., not on every node) and forwarding traffic directly to the storage node via packet switching.

These and other features and advantages are shown and described in detail in reference to the figures.

FIG. 1 is a schematic diagram of a ground and space based network system 100 suitable for implementations according to various embodiments. The network includes backbone nodes 102, 104, e.g., BB1, BB2, BB3, BB4, Ground1, Groun2, Ground3, as well as client nodes, e.g., Node1, Node2, Node3, CL-1, CL-2, CL-3, CL-4. Backbone nodes 102 are space-based, e.g., BB1, BB2, BB3, BB4, and backbone nodes 104 are ground-based, e.g., Ground1, Ground2, Ground3.

Due in part to the presence of the space-based backbone nodes 102, communications on the network may be subject to frequent and prolonged disruptions. Various embodiments may be implemented in the network in order to not only accommodate such disruptions, but also provide rapid and efficient communications when such disruptions are absent or do not affect a particular communication path.

According to various embodiments, when an origination computer, such as any of the backbone nodes 102, 104 or client nodes Node1, Node2, Node3, CL-1, CL-2, CL-3, CL-4, initiates a communication to a destination computer, such as any other of the backbone nodes 102, 104 or client nodes Node1, Node2, Node3, CL-1, CL-2, CL-3, CL-4, it generates and sends a demand communication to a traffic engineering manager at a controller. (An example controller that hosts an example traffic engineering manager is shown and described herein in reference to FIG. 2.) The demand communication specifies the destination computer. The demand communication also specifies the size of the intended communication, e.g., in terms of bytes. Specifying the size allows for the traffic engineering manager to find a suitable intermediary node to store the information on if a path to the destination is not available. The demand communication also specifies zero or more network parameters as requirements for the communication. Such parameters may indicate a minimum quality of service (e.g., a loss for the network path), a minimum capacity (e.g., a bandwidth) and/or type of link the packets can traverse (e.g., wideband, narrowband). A message priority and/or an expiration time may also optionally be specified.

The traffic engineering manager, after receiving the demand, determines whether a path from the origination computer to the destination computer with the specified network parameters is currently available. If so, the traffic engineering manager provides the path information to the origination computer, and the origination computer sends the communication to the destination computer along the indicated path. In this case, the communication may be sent entirely as a packet switched communication from the origination computer to the destination computer. That is, the communication may be sent via zero of more intermediary nodes, e.g., any other of the backbone nodes 102, 104 or client nodes Node1, Node2, Node3, CL-1, CL-2, CL-3, CL-4, without storing the communication at any such node in persistent memory. Rather, the communication may pass through such intermediary nodes by only temporarily passing through volatile memory, such as RAM. Accordingly, such a communication is very fast, particularly compared with a delay tolerant networking communication. The communication may be sent using bi-directional communication, e.g., using TCP/IP, or uni-directional communication, e.g., UDP.

If a path from the origination computer to the destination computer with the specified network parameters is not currently available, the traffic engineering manager determines whether a path to an intermediary storage node with the specified network parameters is available. Such intermediary storage nodes may include, for example, any other of the backbone nodes 102, 104, or client nodes Node1, Node2, Node3, CL-1, CL-2, CL-3, CL-4. If such a path is available, the origination computer sends the data to the intermediary storage node along the path using packet switching, without any storage in persistent memory. The data may be sent using, e.g., uni-directional communication, such as UDP.

In determining an intermediary storage node, the traffic engineering manager may operate to maximize how much data can be offloaded from the origination computer, regardless of where the intermediary storage node is located. Thus, in some instances, the intermediary storage node may be topologically more distant from the destination computer than the origination computer is, e.g., there may be more nodes between the intermediary storage node and the destination computer than there are between the origination computer and the destination computer. The traffic engineering manager may utilize any technique for determining the path. In general, the traffic engineering manager may continually communicate with other network elements and have real-time information regarding network topology as well as all network elements, their storage capacities, and their connections.

Once a communication is stored at an intermediary storage node, the intermediary storage node independently generates a new demand communication and sends it to a traffic engineering manager (which may not be the same traffic engineering manager as received the demand communication from the origination computer). The demand communication sent by the intermediary storage node may include the same network parameters and communication size information as the demand communication from the origination computer.

After a traffic engineering manager receives the demand communication from an intermediary storage node, the process repeats in the same manner as if the intermediary storage node were the origination computer. Namely, the traffic engineering manager determines whether a path to the destination computer with the specified network parameters exists to the destination computer, and if not, it determines a path to another intermediary storage node. Again, the paths between intermediary storage nodes are packet switched, without any communication storage in persistent memory.

Note that if the demand communication specifies an expiration time, which indicates how long data can be stored in the network before making it to the specified destination, whatever storage node the data is in can delete the data once the expiration timer expires.

Because each subsequent intermediary node in which data is persistently stored may generate a new ad-hoc demand communication on behalf of the originator computer, the process for determining paths as executed by the traffic engineering managers may not be end-to-end. Rather, independent routing decisions may be made at each intermediary storage node. This process allows intermediary nodes to make informed decisions, taking into consideration other stored data (e.g., priority, size, destination, etc.).

In more detail, while the new demand requests may be submitted to a local traffic engineering manager, all traffic engineering managers may operate in a synchronized manner (e.g., if in a distributed deployment) or there may be a centralized traffic engineering manager. When a new demand request is generated for stored data, the request is synched; the traffic engineering manager is triggered to run using the latest demand set and network status (e.g., topology, capacity, link status, such as delay, loss, and/or jitter, etc.).

Figure 2:
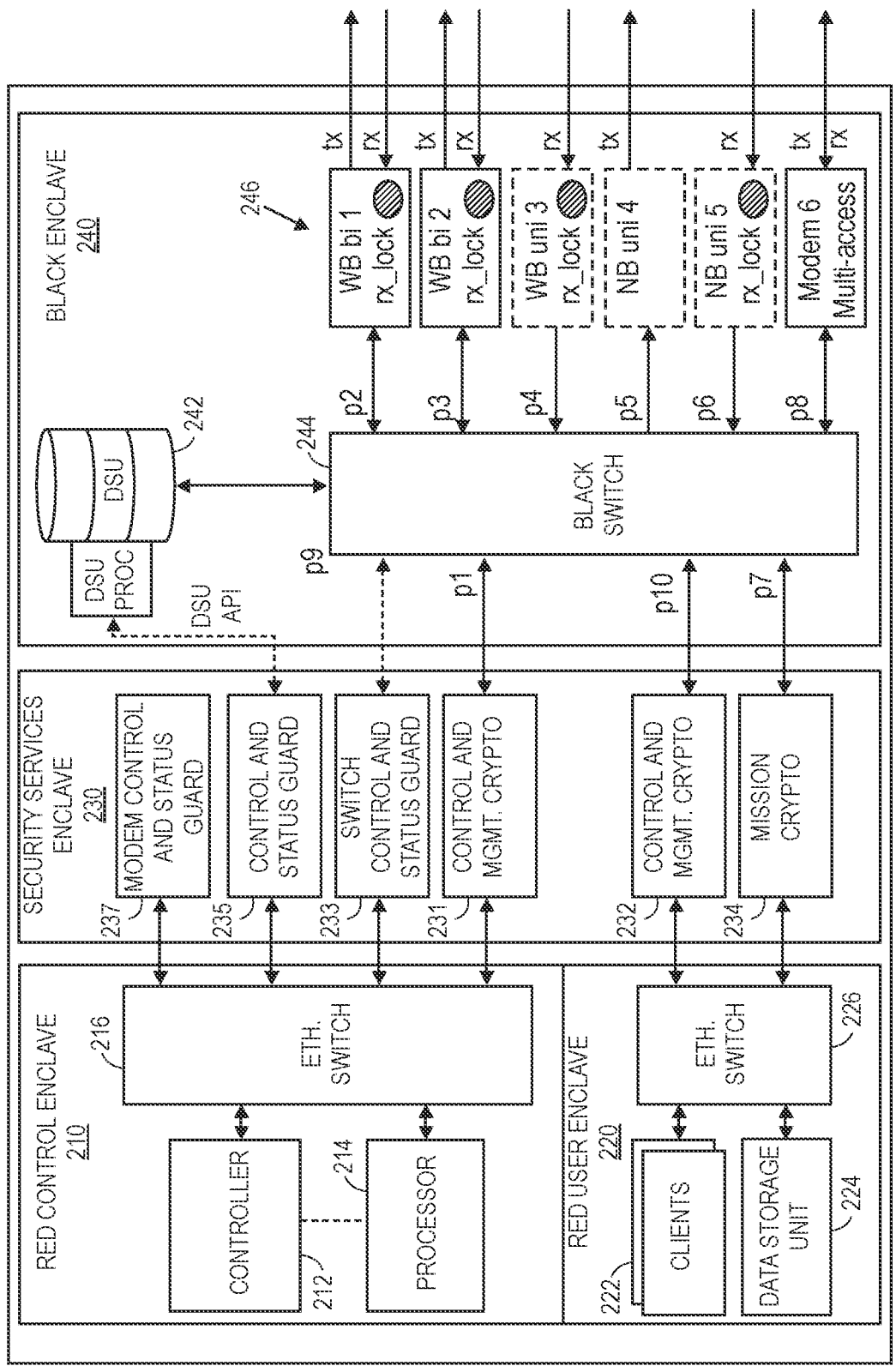
FIG. 2 is a schematic diagram of a space-based node according to various embodiments.

FIG. 2 is a schematic diagram of a space-based node 200 according to various embodiments. The space-based node 200 may be implemented in a satellite, in an aircraft, or in a spacecraft, for example.

The space-based node 200 accommodates two different security domains, referred to herein as "red" and "black." The red security domain may decrypt encrypted data and may handle (e.g., store, process, and/or transfer) plaintext (i.e., unencrypted) data. The black security domain may handle (e.g., store, process, and/or transfer) encrypted data (except for, e.g., unencrypted headers at some protocol layers) and may be prevented from decrypting data. Thus, as shown in FIG. 2, the space-based node 200 includes red control enclave 210 and red user enclave 220, which may receive, process, store, communicate, and otherwise handle unencrypted and/or non-secure communications and data, and a black enclave 240, which may receive, process, store, communicate, and otherwise handle encrypted and/or secure communications and data. The space-based node 200 also includes a security services enclave 230, which encrypts and decrypts data for the other enclaves, as well as enforces enclave policies, such as enforcing intra-platform control plane traffic between security domains, e.g., preventing the black enclave 240 from receiving decrypted data.

The space-based node may provide client node functionality, e.g., that of any of client nodes Node1, Node2, Node3, CL-1, CL-2, CL-3, CL 4 as shown and described herein in reference to FIG. 1, e.g., using elements from the red user enclave 220. The space-based node 200 may also, or in the alternative, operate as a backbone node, e.g., any of backbone nodes 102, 104 as shown and described herein in reference to FIG. 1, e.g., using elements from the red control enclave 210, the security services enclave 230, and/or the black enclave 240.

The red user enclave 220 includes clients 222, data storage unit 224, and ethernet switch 226. The clients 222 in the red user enclave 220 may be any type of computer, e.g., a mission computer, and may generate or otherwise obtain or provide data that may be sent in the capacity of an origination computer to a destination computer. The data storage unit 224 in the red user enclave 220 may include a persistent memory, such as a hard drive. In general, data may originate from the red storage unit 224 and be stored on an intermediary black storage node, such as in the data storage unit 242 of the black enclave 240, as encrypted packets/frames. The ethernet switch 226 in the red user enclave 220 may be used for communications between the red user enclave 220 and any of the red control enclave 210, the security services enclave 230 and/or the black enclave 240.

The red control enclave 210 includes a controller 212, a processor 214, and an ethernet switch 216. The controller 212 in the red control enclave 210 may host a traffic engineering manager, as described herein in reference to FIG. 1, for example. The controller 212 may also execute data storage unit control software, to operate the data storage unit 242 in the black enclave 240. The processor 214 in the red control enclave 210 may be used for any processing required by the red control enclave 210. The ethernet switch 216 in the red control enclave 210 may be used for communications between the red control enclave 210 and any of the red user enclave 220, the security services enclave 230 and/or the black enclave 240.

The security services enclave 230 administers security for the space-based node 200, including administrating encryption and decryption of communications between the red control enclave 210, the red user enclave 220, and the black enclave 240. The security services enclave 230 also enforces the security domain policies, such as forbidding the black enclave 240 from obtaining plaintext data or decrypting encrypted data (except, in some instances, lower layer protocol headers, for example). More generally, the security services enclave may employ one or more cross domain guards or cross domain solutions. Elements of the security services enclave 230 are described presently.

Regarding communications between the red user enclave 220 and the black enclave 240, the security services enclave 230 includes mission cryptography 232 for encrypting and decrypting mission-related communications between the red user enclave 220 and the black enclave 240. The security services enclave 230 also includes control and management cryptography 232 for encrypting, decrypting, and managing administrative communications to and from the red user enclave 220.

Regarding communications between the red control enclave 210 and the black enclave 240, the security services enclave 230 includes control and management cryptography 231 for encrypting, decrypting, and managing communications between the red control enclave 210 and the black enclave. The security services enclave 230 also includes modem control and status guard 237, for controlling and managing communication modulation. For example, the modem control and status guard 237 may control modems 246 in the black enclave 240. The security services enclave 230 also includes control and status guard 235, which mediates communications between the red control enclave 210 and the black enclave 240 related to the space-based node's operation as an intermediary node. For example, communications that the space-based node 200 receive from an origination computer, or a different intermediary node, may be routed through, and encrypted or decrypted by, the control and status guard 235. The security services enclave 240 also includes switch control and status guard 233, which mediates on-board communications between the red control enclave 210 and the black enclave 240.

The black enclave 240 includes data storage unit 242 and its associated processor, switch 244, and modems 246. The data storage unit 242 in the black user enclave 240 stores encrypted packets in the capacity of the intermediary node functionality of the space-based node 200. The encrypted packets may be stored in packet format without any part thereof being decrypted. The stored encrypted packets may have originated from a different intermediary node, an originating computer in a separate physical location, or an originating computer such as one of the clients 222 present in the red user enclave 220. The encrypted packets may be stored in association with an order of their receipt by the space-based node 200. For example, the encrypted packets may be stored with an enumeration that indicates the order of their receipt. The switch 244 in the black user enclave 240 facilitates communications between the black enclave 240 and the security services enclave 230, the red control enclave 210, the red user enclave 220, and/or external nodes via the modems 246. The modems 246 in the black user enclave 240 include modems that are transmit/receive, as well as modems that are dedicated transmit and dedicated receive.

Figure 3:
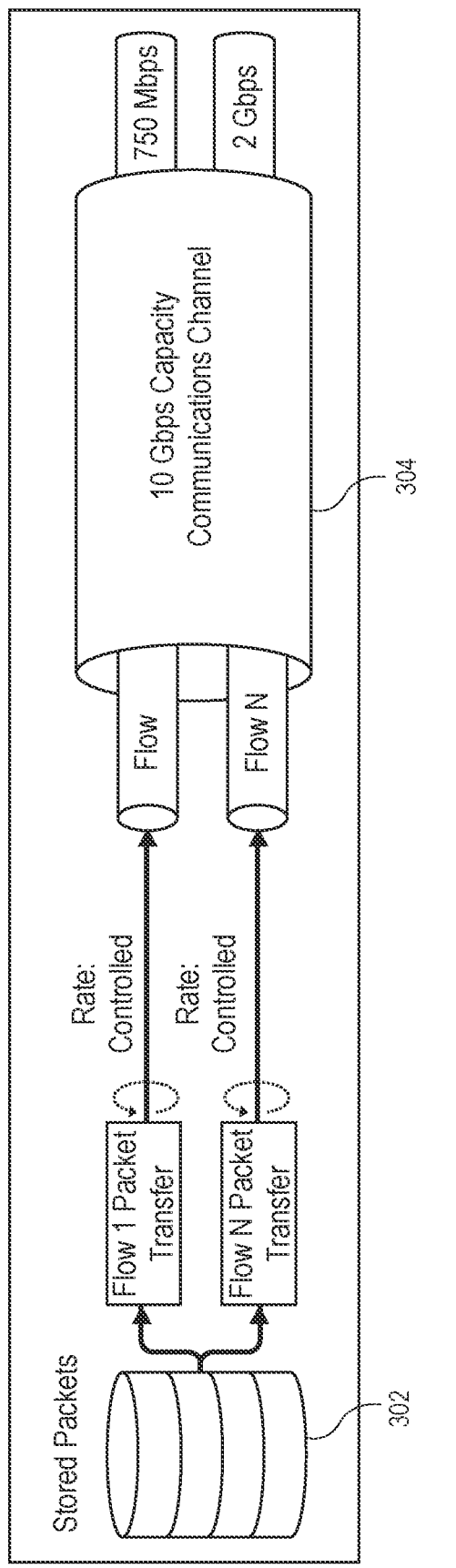
FIG. 3 is a schematic diagram of a packet storage unit and a packet communications channel according to various embodiments.

FIG. 3 is a schematic diagram 300 of a packet storage unit 302 and a packet communications channel 304 according to various embodiments. In general, the packet storage unit 302 and packet communications channel 304 may be part of a storage node, such as an intermediary storage node. For example, the packet storage unit 302 may include an implementation of the data storage unit 242 as shown and described herein in reference to FIG. 2. As another example, the communications channel 304 may include an implementation of one or both of the switch 244 and/or modems 246 as shown and described herein in reference to FIG. 2. The packet storage unit 302 and packet communication channel 304 may operate to send, receive, and store packets as described presently.

To receive packets, a traffic engineering manager, e.g., the traffic engineering manager hosted by the controller 212 as shown and described herein in reference to FIG. 2, may inform the storage node when a demand is admitted. For example, the traffic engineering manager may indicate that the required network parameters in the demand communication are met for a particular path, and may also provide an indication as to how to identify the packets that are to be sent over the path and received over the communication channel 304. Such an indication may, for example, specify information in packet headers and/or metadata that identifies the packets. The traffic engineering manager may inform the storage node a name to assign to the packets for storage in the package storage 202. Such a name may specify an identification of the demand communication and/or an identification of the requesting user (e.g., a requesting computer) that issued the demand communication.

To transmit packets, the traffic engineering manager may instruct the storage node to transmit the packets using an assigned name, which may specify an identification of the demand communication and/or an identification of the requesting user (e.g., a requesting computer) that issued the demand communication. The storage node may rate control each transmission stream in the communications channel 304 in accordance with the admitted demand parameters as directed by the traffic engineering manager. The storage node may modify the destination MAC address for each flow transmission as directed by the traffic engineering manager.

Figure 4:
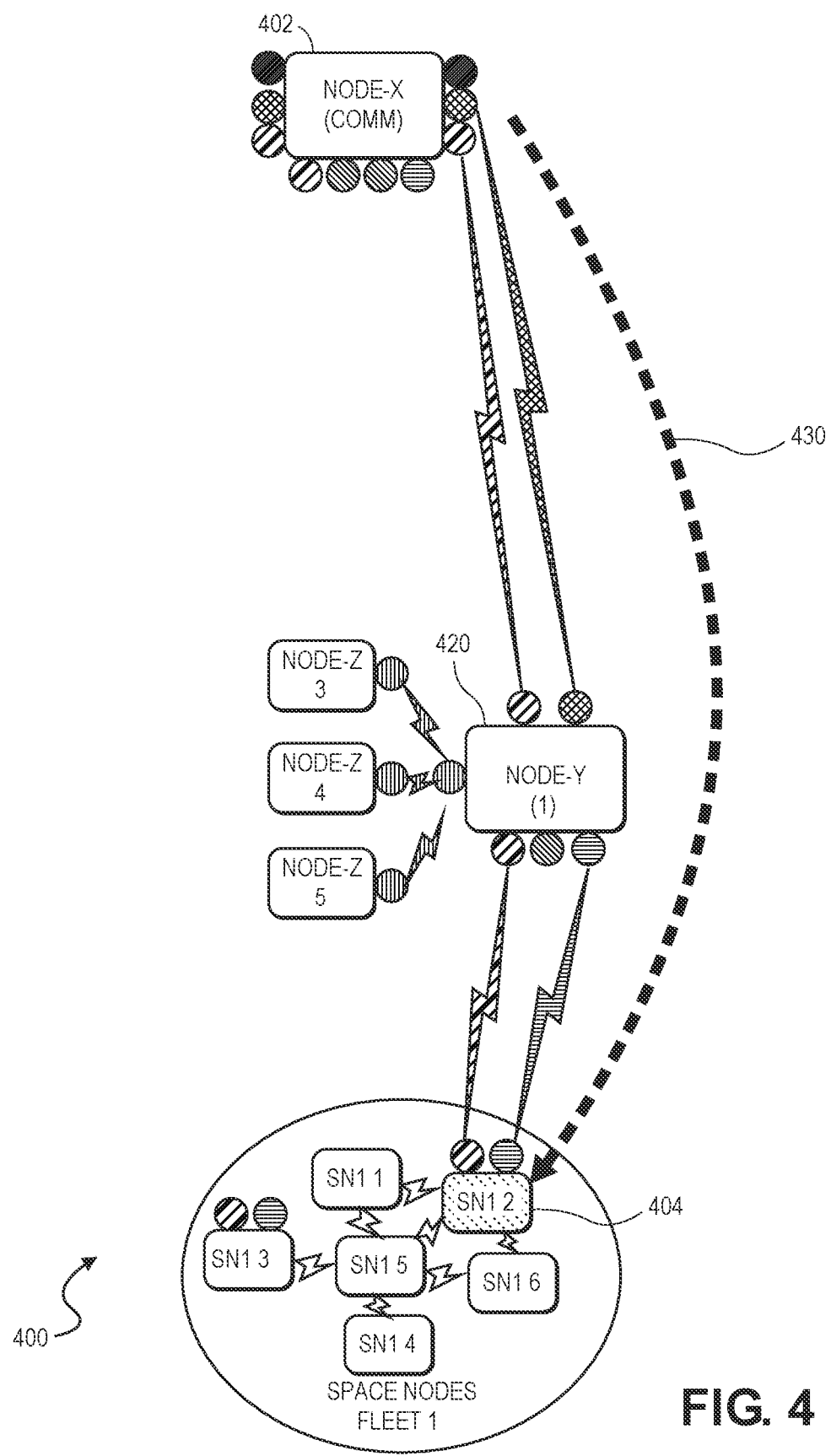
FIG. 4 illustrates a communication hop on a network portion according to various embodiments.

FIG. 4 illustrates a communication 430 hop on a network 400 portion according to various embodiments. The communication 430 hop is shown as being from computer 402 to computer 404. Computer 402 may be an origination computer or an intermediary storage node, and computer 404 may be a destination computer or an intermediary storage node.

To send the communication 430, a traffic engineering manager may determine a communication path from the computer 402 to the computer 404. The traffic engineering manager may have identified the computer 404 as having sufficient storage capacity based on a demand communication from the computer 402, e.g., if the computer 404 is an intermediary storage node. According to some embodiments, all packets from computer 402 to computer 404 are packet switched, as opposed to being completely stored in persistent memory in all nodes and resent, as in ION or IBR delay tolerant networking. Thus, according to various embodiments, the communication 430 is not stored in persistent memory in node 420. Rather, the communication 430 passes through volatile memory at node 430.

Note that according to some embodiments, the traffic engineering manager does not utilize discovery protocols to find nodes. Some embodiments include a topology manager, which runs on every backbone node and manages the status of each communication link, e.g., for rx lock, rx unlock, reported capacity change (e.g. mod/cod), delay, etc. Like the traffic engineering managers, all topology managers may be synched.

Some embodiments thus eliminate the per-hop storage penalty of current delay tolerant networking systems (e.g., ION and IBR). As shown in FIG. 4, such delay tolerant networking systems would store the communication 430 as bundles at node 420 in persistent memory.

Figure 5:
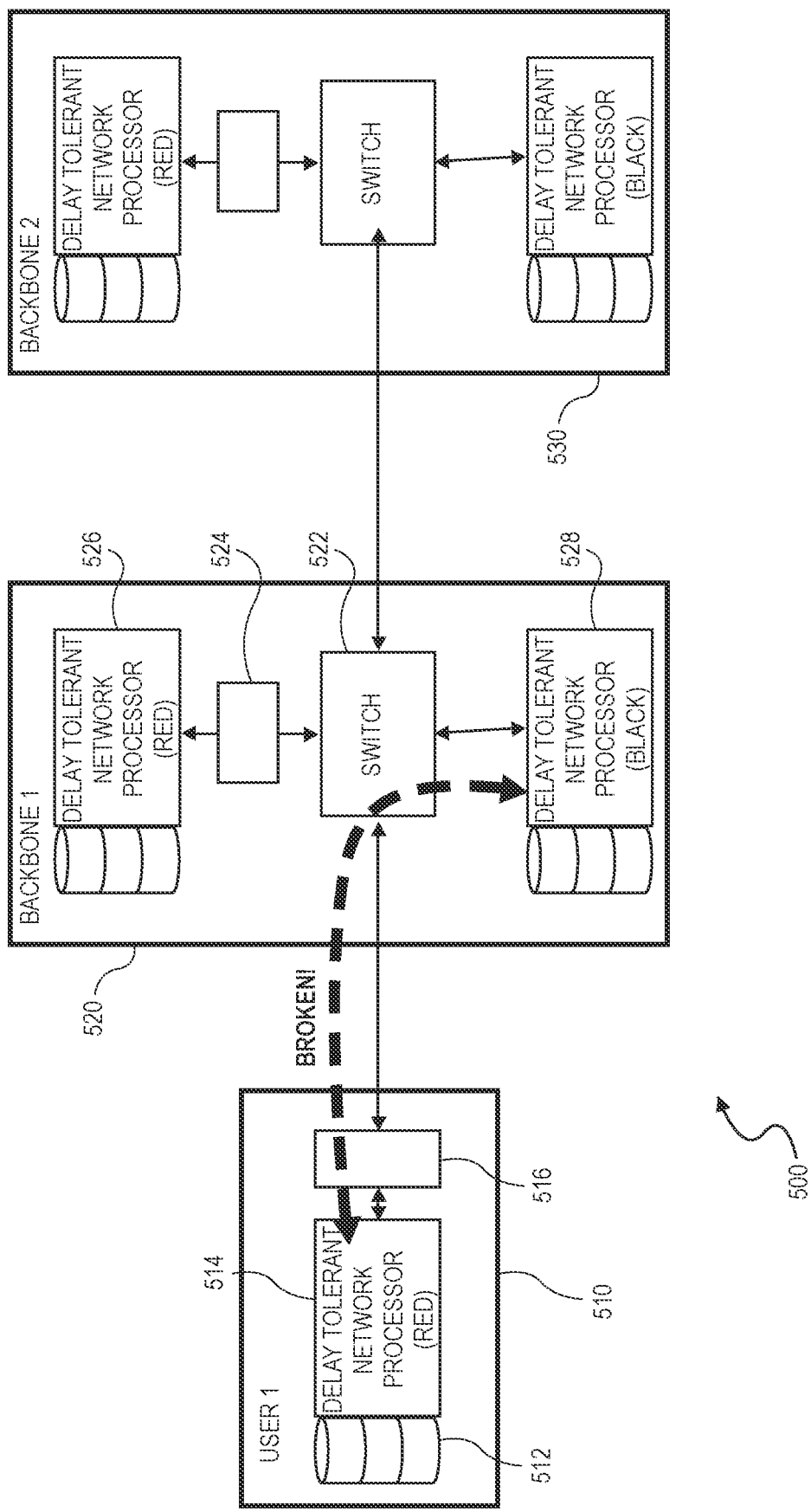
FIG. 5 is a schematic diagram illustrating delay tolerant networking failing to operate in a security domain with decryption limitations.

FIG. 5 is a schematic diagram 500 illustrating delay tolerant networking (e.g., IOR or IBR) failing to operate in a security domain with decryption limitations. The system illustrated in FIG. 5 includes red and black security domains. The black security domain of FIG. 5 cannot decrypt data, or receive or handle decrypted data (except to receive and handle unencrypted link layer and/or network layer protocol headers). The red security domain of FIG. 5 is permitted to handle decrypted data.

As shown in FIG. 5, User 1 510, as an origination computer, intends to send data to a destination computer, and the delay tolerant networking system determines a path that routes the data through Backbone 1 520. The data may originate from data storage unit 512. The delay tolerant network processor 514 in the red security domain bundles the data into delay tolerant networking bundles. The security services enclave 516 then encrypts all of the data above the transport layer, thus encrypting the delay tolerant networking bundle headers. User 1 510 then sends the delay tolerant networking bundles to Backbone 1 520. Backbone 1 520 receives the bundles at switch 522.

Switch 522 can either forward the bundles to the red security domain or the black security domain of Backbone 1 520. For the red security domain, switch 522 forwards the bundles to the security services enclave 524 for decryption, and the decrypted data is passed to the delay tolerant network processor 526 in the red security domain (the decrypted data cannot be passed to the black security domain unless re-encrypted). In the red security domain, the delay tolerant networking processor 526 can parse the decrypted bundle headers to determine how to route the data according to the bundle protocol of the delay tolerant network system, e.g., to Backbone 530. However, for the black security domain, if switch 522 forwards the bundles to the delay tolerant networking processor 528 in the black security domain, the bundle headers must remain encrypted. The delay tolerant network processor 528 cannot parse the encrypted bundle headers to determine how to route the bundles according to the bundle layer protocol of the delay tolerant networking system. Therefore, the data communication cannot proceed.

Thus, FIG. 5 illustrates that delay tolerant network systems cannot perform communications entirely within the black security domain. In particular, delay tolerant networking systems are unable to decrypt bundle headers in the black security domain, and is therefore unable to route the bundles.

Figure 6:
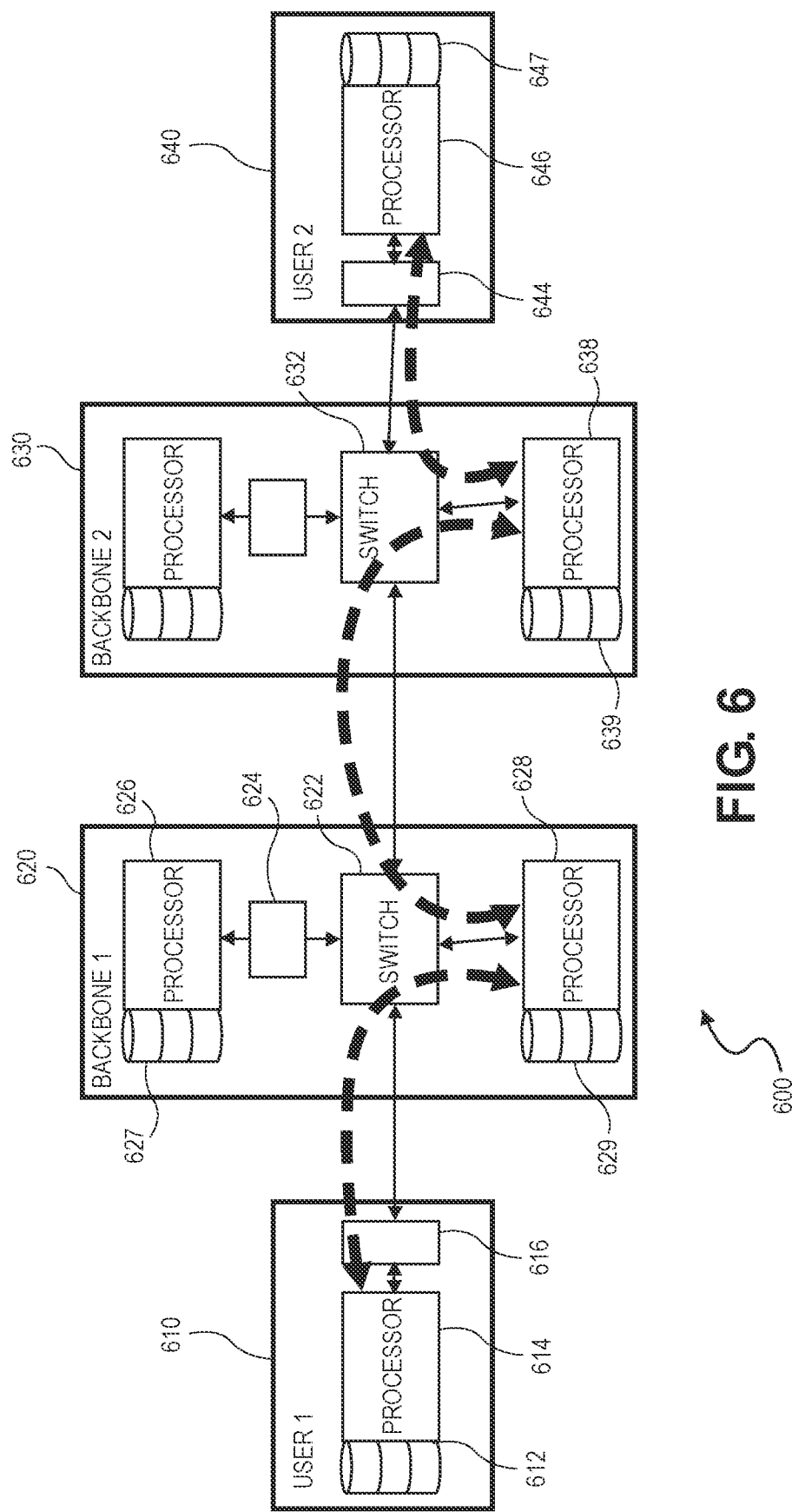
FIG. 6 is a schematic diagram of a system, illustrating communications within a security domain with decryption limitations according to various embodiments.

FIG. 6 is a schematic diagram of a system 600, illustrating communications within a security domain with decryption limitations according to various embodiments. The system of FIG. 6 includes red and black security domains. The black security domain of FIG. 6 cannot decrypt data, or receive or handle decrypted data (except to receive and handle unencrypted link layer and/or network layer protocol headers). Communication channels between nodes may be within the black security domain. The red security domain of FIG. 6 is permitted to decrypt data and handle decrypted data.

As shown in FIG. 6, an origination computer 610, User 1, intends to send data to destination computer 640, User 2. The origination computer 610 sends a demand communication to a traffic engineering manager, as disclosed herein, which determines that a path that meets the demand network parameters is not currently available. The traffic engineering manager thus routes the data to Backbone 1 620 for storage in persistent memory. The data may originate from data storage unit 612. The processor 614 in the red security domain of User 1 retrieves the data from data storage unit 612 and passes it to the security services enclave 616 to encrypt all of the data above the, by way of non-limiting example, the transport layer, leaving the transport layer, network layer, and link layer headers unencrypted, but encrypting the application layer data. User 1 then sends the data to Backbone 1 620. The packets may pass through intermediary nodes between User 1 and Backbone 1 620 using packet switching, without the data being stored in persistent memory on any such intermediary nodes. No special additional protocol layer is required or used. Further, no bi-directional communication between User 1 and Backbone 1 620 is required, as Backbone 1 620 will store the encrypted data packets as-is, as described below. Backbone 1 620 receives the data via switch 622. Switch 622 can direct the data to the red security domain, the black security domain, or on to Backbone 2 630, and it will be correctly routed either way.

If directed to the red security domain, the data passes through the security services enclave 624 where it is decrypted, and then on to the processor 626 in the red security domain. The processor 626 in the red security domain then stores the data in the data storage unit 627 in the red security domain. The processor 626 in the red security domain then routes the packets using the data in the headers of the transport layer, network layer, and link layer, in cooperation with a traffic engineering manager, as shown and described herein in reference to FIGS. 1-4.

If the data is to remain in the black security domain, switch 622 passes it to the processor 628 in the black security domain. The processor 628 in the black security domain stores the packets as-is, in association with an indication of the order in which they are received. For example, the packets may be stored with an enumeration indicating their order of receipt. The packets are stored in encrypted format. According to some embodiments, no part of the packets is decrypted in the black security domain. However, according to this example, the transport layer, network layer, and link layer headers remain unencrypted. Accordingly, because in this example no additional protocol layers are required or used to route the packets, the processor 626 in the black security domain can use the information in these headers to route the packets, in cooperation with a traffic engineering manager, as shown and described herein in reference to FIGS. 1-4.

Whether the data remains in the black security domain or is passed to the red security domain in Backbone 1 620, Backbone 1 sends a demand communication to a traffic engineering manager as described herein in reference to FIGS. 1-4, which may determine that a path directly to the destination computer 640 is not available and instead route the data to Backbone 2 630 for storage in persistent memory. The packets may pass through intermediary nodes between Backbone 1 620 and Backbone 2 630 using packet switching, without the data being stored in persistent memory on any such intermediary nodes. The packets may be sent out in the same order in which they arrived at Backbone 1 620. Further, no bi-directional communication between Backbone 1 620 and Backbone 2 630 is required.

By way of non-limiting example, Backbone 2 630 keeps the data in the black security domain, and switch 632 passes the data to the processor 638 in the black security domain of Backbone 2 630. As in Backbone 1 620, the processor 638 in the black security domain of Backbone 2 630 stores the data in packet format, without decrypting any part, in the data storage unit 639 in the black security domain. Again, the packets may be stored in association with an indication of an order of receipt.

The processor 636 in the black security domain of Backbone 2 630 can use the information in the unencrypted headers of the stored packets to route the packets, in cooperation with a traffic engineering manager, as shown and described herein in reference to FIGS. 1-4, to the destination computer 640. For example, Backbone 2 630 may send a demand communication to the traffic engineering manager, which may find a path that admits the demand directly to the destination computer 640. Backbone 2 630 thus sends the packets to the destination computer 640. The packets may be sent out in the same order in which they arrived at Backbone 2 630, which may be in the same order in which they arrived at Backbone 1 620. The packets may pass through intermediary nodes between Backbone 2 630 and the destination computer 640 using packet switching, without the data being stored in persistent memory on any such intermediary nodes.

The destination computer 640, User 2, receives the encrypted packets and may direct them through its security services enclave 644, where they are decrypted, e.g., the data above the transport layer that was encrypted by User 1 is decrypted, including the application layer data. The security services enclave 644 passes the decrypted data to the processor 646 in the red security domain, and the processor 646 consumes and/or stores the data in the data storage unit 647 of User 2. Note that User 2 may receive the packets as if they were directly transmitted by User 1. For example, there may be no indication in the packets that they were stored in any network nodes.

Figure 7:
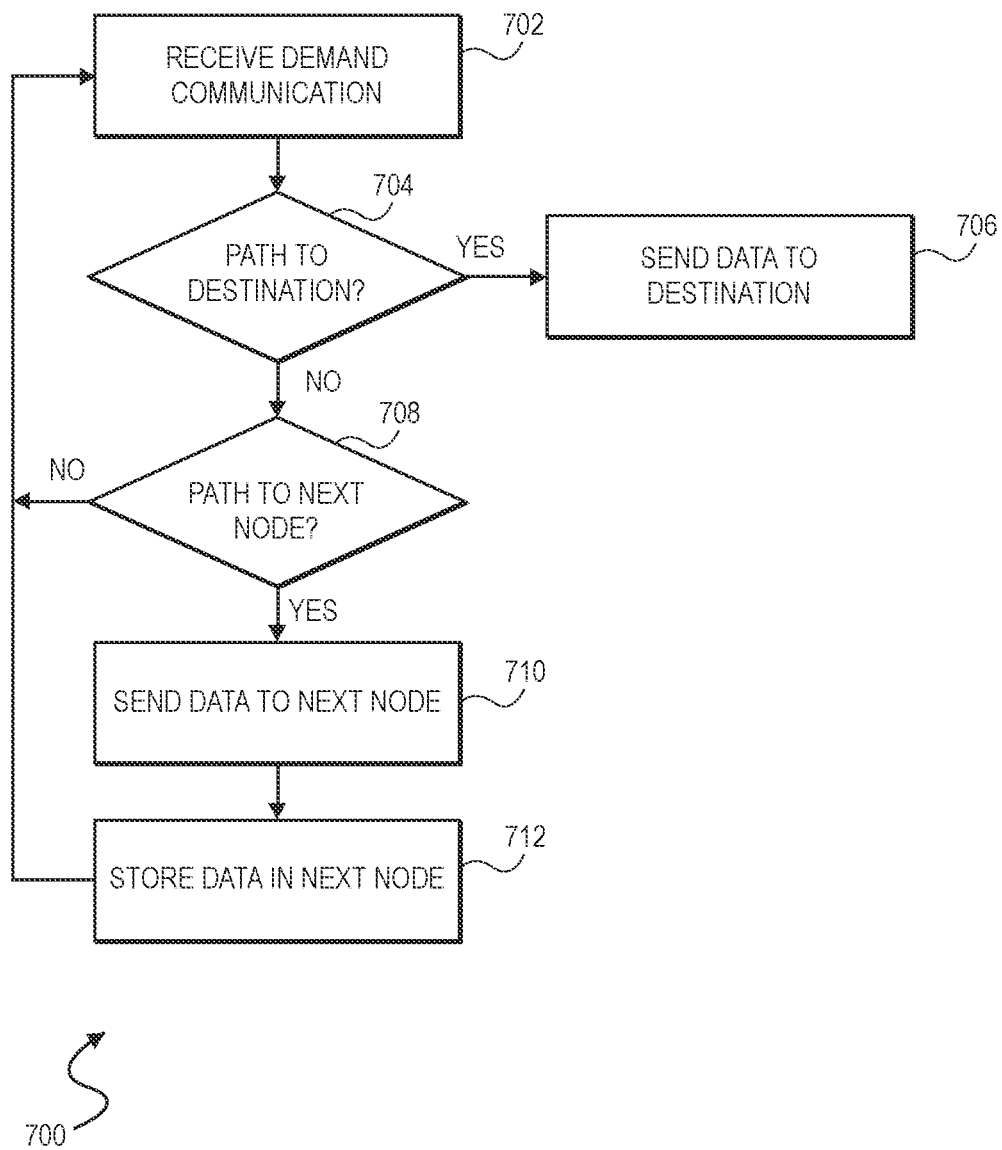
FIG. 7 is a flowchart for a method of sending data over a computer network from an origination computer to a destination computer according to various embodiments.

FIG. 7 is a flowchart for a method 700 of sending data over a computer network from an origination computer to a destination computer according to various embodiments. The method 700 may be implemented in a system as disclosed herein, e.g., as shown and described herein in reference to FIG. 1 and FIG. 6. The system may include nodes as disclosed herein, e.g., as shown and described herein in reference to FIGS. 2 and 3.

At block 702, the method 700 receives a demand communication, e.g., at a traffic engineering manager as shown and described herein in reference to FIGS. 1-4 and 6. The demand communication may be for data that is to be sent from an origination computer to a destination computer. The demand communication may be sent by the origination computer or by an intermediary storage node. The demand communication may specify a communication size and/or one or more required network parameters.

At block 704, the method 700 determines whether a path to the destination computer exists that admits the demand. This process may be performed by a traffic engineering manager as shown and described herein in reference to FIGS. 1-4 and 6. If so, control passes to block 706, and the data are sent to the destination computer along the path, which may include intermediary nodes that do not store the data in persistent memory. The data may be sent as shown and described herein in reference to FIGS. 1-4 and 6, for example. The data may be sent from the origination computer or from an intermediary storage node, for example. The data may be encrypted above a particular protocol layer, such as the transport protocol layer, for example. The data may be sent without requiring bi-directional communication, for example. If the method 700 determines that a path to the destination computer that admits the demand is not currently available, then control passes to block 708.

At block 708, the method 700 determines whether a path to a next node, e.g., an intermediary storage node, exists that admits the demand. This process may be performed by a traffic engineering manager as shown and described herein in reference to FIGS. 1-4 and 6. If not, control reverts to block 702, and a portion of the method 700 repeats until the data reaches the destination computer. If the method 700 determines that a path to a next node that admits the demand exists, then control passes to block 710.

At block 710, the method 700 sends the data to the next node. The data may be sent as shown and described herein in reference to FIGS. 1-4 and 6. The data may be sent from the origination computer or from an intermediary storage node, for example. The data may be encrypted above a particular protocol layer, such as the transport protocol layer, for example. The data may be sent without requiring bi-directional communication, for example.

At block 712, the method 700 stores the data in the next node. The data may be stored as shown and described herein in reference to FIGS. 1-4 and 6, for example. The data may be stored in persistent memory, and the data may be stored in packet format, encrypted, in association with an indication of an order of arrival.

Many alternative embodiments and variations are contemplated. For example, the term "packet" as used herein may generically refer to any protocol data unit at any layer, depending on context. Depending on context, a packet is not limited to network layer packets. Further, the protocol layers referred to herein are non-limiting examples. In general, embodiments may utilize any protocol, e.g., that permits encapsulation of encrypted source data, whether such protocol is standards-based or otherwise, such that a black security domain can obtain unencrypted routing information. Further, the routing information described herein can be in any part of a protocol data unit, not limited to a header.

Certain examples can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by a processor.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on a user's computer, partly on the user's computer, as a stand-alone software package, partly on the user's computer and partly on a remote computer or entirely on the remote computer or server.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of sending data over a computer network from an origination computer to a destination computer, the method comprising:
    receiving a demand communication from the origination computer, wherein the demand communication specifies at least one network parameter;
    determining that a path through the network from the origination computer to the destination computer that complies with the at least one network parameter is not available;
    sending data from the origination computer to a node in the network over a path that complies with the at least one network parameter, wherein the node is not the destination computer;
    storing the data at the node in persistent memory;
    receiving a second demand communication from the node, wherein the second demand communication specifies the at least one network parameter;
    determining that a path from the node to one of a next node or the destination computer that complies with the at least one network parameter is available; and
    sending the data from the node to the one of the next node or the destination computer.

2. The method of claim 1, wherein the sending the data comprises sending the data through at least one intermediate node using packet switching without storing the data in persistent memory at the intermediate node.

3. The method of claim 1,
    wherein the sending the data from the node to the one of the next node or the destination computer comprises sending the data from the node to the destination computer using packet switching.

4. The method of claim 1,
    wherein the sending the data from the node to the one of the next node or the destination computer comprises sending the data from the node to the next node using packet switching,
    the method further comprising storing the data at the next node in persistent memory.

5. The method of claim 1, wherein the at least one network parameter comprises at least one of: a specified bandwidth, a specified network loss, a specified delay, or a specified priority.

6. The method of claim 1, wherein the demand communication specifies a size of the data.

7. The method of claim 1, wherein the node is space based.

8. The method of claim 1,
    wherein the sending the data comprises sending a plurality of protocol data units,
    wherein each of the protocol data units comprises a header and an encrypted payload, and
    wherein the storing comprises storing the protocol data units in association with an order of arrival.

9. The method of claim 8, further comprising:
    sending the protocol data units from the node to one of a next node or the destination computer without requiring decryption of any encrypted payload.

10. The method of claim 8,
    wherein the storing comprises storing in a black security domain, and
    wherein each encrypted payload is stored in encrypted format.

11. A system for sending data over a computer network from an origination computer to a destination computer, the system comprising:
    an origination computer disposed to send a demand communication to a traffic engineering manager, wherein the demand communication specifies at least one network parameter;
    a traffic engineering manager disposed to receive the demand communication from the origination computer and determine that a path through the network from the origination computer to the destination computer that complies with the at least one network parameter is not available;
    a node in the network disposed to receive the data from the origination computer over a path that complies with the at least one network parameter and store the data at the node in persistent memory, wherein the node is not the destination computer, wherein the node is disposed to send a second demand communication to a second traffic engineering manager, wherein the second demand communication specifies the at least one network parameter, the system further comprising:
    a second traffic engineering manager disposed to receive the second demand communication from the node and determine that a path from the node to one of a next node or the destination computer that complies with the at least one network parameter is available,
    wherein the node sends to data to the one of the next node or the destination computer.

12. The system of claim 11, further comprising an intermediate node, wherein the origination computer sends the data through the intermediate node to the node using packet switching without the data being stored in persistent memory at the intermediate node.

13. The system of claim 11,
    wherein the node sends to data to the destination computer using packet switching.

14. The system of claim 11, further comprising
    a next node disposed to receive the data from the node using packet switching and store the data in persistent memory.

15. The system of claim 11, wherein the at least one network parameter comprises at least one of: a specified bandwidth, a specified network loss, a specified delay, or a specified priority.

16. The system of claim 11, wherein the demand communication specifies a size of the data.

17. The system of claim 11, wherein the node is space based.

18. The system of claim 11,
wherein the origination computer sends the data in a plurality of protocol data units, wherein each of the protocol data units comprises a header and an encrypted payload, and
wherein the node stores the protocol data units in association with an order of arrival.

19. The system of claim 18, wherein the node is configured to send the protocol data units to one of a next node or to the destination computer without requiring decryption of any encrypted payload.

20. The system of claim 18, wherein the node is configured to store the protocol data units in encrypted format in a black security domain.

\* \* \* \* \*